United States Patent [19]

Suzuki

[11] Patent Number: 4,472,808

[45] Date of Patent: Sep. 18, 1984

[54] WAVEGUIDE TYPE GAS LASER APPARATUS

[75] Inventor: Masaharu Suzuki, Ootawara, Japan

[73] Assignee: Tokyo Shibaura Denki Kabushiki Kaisha, Kawasaki, Japan

[21] Appl. No.: 392,017

[22] Filed: Jun. 25, 1982

[30] Foreign Application Priority Data

Jun. 25, 1981 [JP] Japan .................................. 56-98858

[51] Int. Cl.³ ............................................. H01S 3/03
[52] U.S. Cl. ..................................... 372/64; 372/25; 372/30
[58] Field of Search .................... 372/29, 83, 30, 8, 25, 372/38, 87

[56] References Cited

U.S. PATENT DOCUMENTS

| 3,772,611 | 11/1973 | Smith | 372/96 |
| 4,009,385 | 2/1977 | Sell | 372/38 |
| 4,103,255 | 7/1978 | Schlossberg | 372/64 |
| 4,169,251 | 9/1979 | Laakmann | 372/64 |

Primary Examiner—William L. Sikes
Assistant Examiner—Léon Scott, Jr.
Attorney, Agent, or Firm—Finnegan, Henderson, Farabow, Garrett, Dunner

[57] ABSTRACT

A digital signal having three logic levels is repeatedly applied to opposite facing electrodes of a waveguide type gas laser apparatus in order to excite laser gas positioned between said electrodes. The three logic level pulse form includes pulses having alternate positive, zero, negative, and zero voltage levels in order to permit D class amplification.

4 Claims, 11 Drawing Figures

WAVEGUIDE TYPE GAS LASER APPARATUS

BACKGROUND OF THE INVENTION

I. Field of the Invention

The present invention relates to apparatus for exciting waveguide type gas lasers.

II. Description of the Prior Art

Waveguide type gas lasers have been developed in which a laser beam is generated by the excitation of gas located within a hollow waveguide passageway. There are presently two basic excitation techniques for waveguide type laser apparatus. One of these known techniques is conventional DC excitation which involves application of a DC voltage on the order of 10 KV to the electrodes of a waveguide type gas laser. The second of these known techniques involves radio frequency excitation in the VHF or UHF range of 30 Mhz to 3 Ghz.

Figures 1, 2:
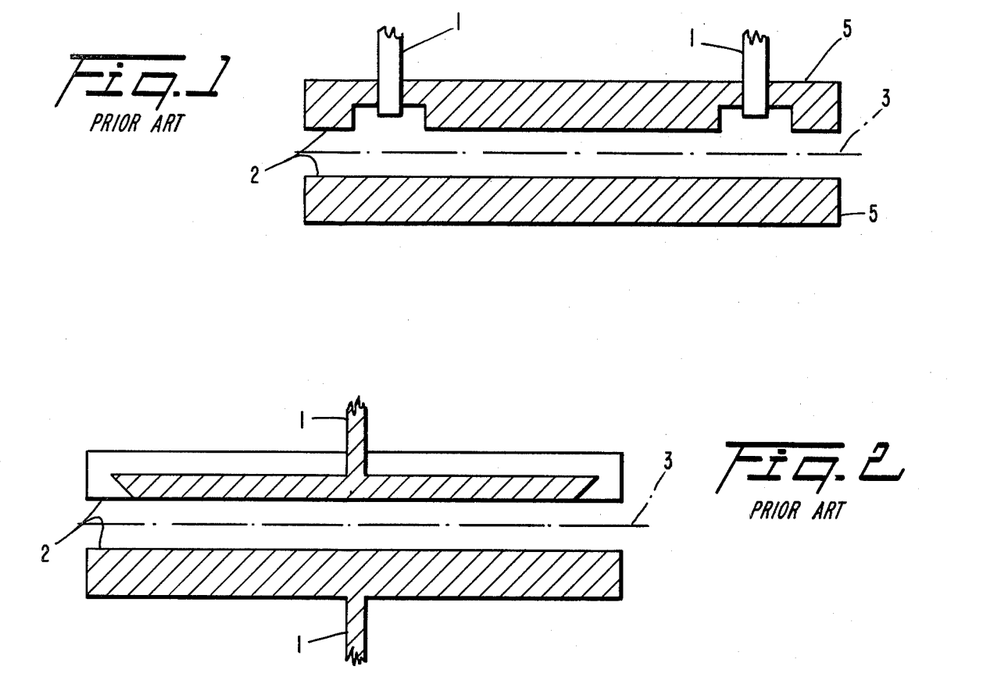
FIG. 1 schematically illustrates a section of a waveguide employed in a longitudinal excitation system.
FIG. 2 schematically illustrates a section of a waveguide employed in a transverse excitation system.

The above-mentioned DC excitation technique may be classified into two varieties depending upon whether the path of discharge between the electrodes is parallel to the light axis of the laser (lengthwise excitation) or perpendicular to that axis (transverse excitation). An example of a discharge path between electrodes being parallel to the light axis of a laser is illustrated in FIG. 1. More particularly, in FIG. 1 a light axis 3 is shown located within a waveguide passageway 2 which is defined by electrodes 1 and an insulation housing 5. Electrodes 1 are located along passageway 2 such that when a discharge occurs between electrodes 1, the discharge occurs parallel to the direction of light axis 3.

In FIG. 2 there is illustrated a light axis 3 located within a passageway 2. In FIG. 2 electrodes 1 are disposed facing one another on either side of light axis 3. Accordingly, any discharge between electrodes will follow a path generally perpendicular to the direction of light axis 3.

Either arrangement illustrated in FIG. 1 or FIG. 2 allows a discharge between electrodes 1 and allows light resulting from that discharge to be reflected between resonant mirrors (not shown) disposed at the ends of passageway 2 to cause oscillation and thereby permit emission of an amplified laser beam.

However, in the excitation arrangement illustrated in FIG. 1, since the distance between electrodes 1 is long, such a system requires a high voltage be applied between electrodes 1 in order to achieve satisfactory discharge of gas located in passageway 2. Moreover, in such systems electrodes 1, passageway 2, and the resonant mirrors are put in a laser tube which is hermetically sealed to contain gas under pressure. The pressure of the gas is high to maximize the lifetime of the apparatus. However, this high gas pressure increases the voltage requirement to achieve satisfactory discharge.

The arrangement shown in FIG. 2, on the other hand can be used with a lower application voltage than the lengthwise excitation system of FIG. 1 since, as shown in FIG. 2, the faces of electrodes 1 are parallel to one another and, therefore, are positioned at a short distance from one another. Moreover, although the transverse excitation system as illustrated in FIG. 2 has an advantage in that such a system permits use of increased gas pressure without undue increase in required voltage levels, the transverse excitation system of FIG. 2 has a disadvantage in that it is difficult to achieve uniform discharge in passageway 2 due to the existence of parallel faced electrodes 1.

Furthermore, a common disadvantage of both DC excitation systems of FIGS. 1 and 2 is that such systems require connection to a ballast resistance in series with electrodes 1, thereby decreasing efficiency and increasing the requisite size of the apparatus. Moreover, both systems are subject to very large voltage increases in the vicinity of the cathode known as a "cathode fall" phenomena. This phenomena results in spattering of cathode electrodes and adjacent mirrors, which in turn results in a decrease in laser output. The high resultant electric field in the area of the cathode also causes separation of laser gas which tends to shorten the life of the apparatus.

DC excitation waveguide gas lasers are disclosed for example, in U.S. Pat. No. 3,772,611 issued to Smith and 4,103,255 issued to Schlossberg. Although such DC excitation systems had the advantage of employing a power supply with comparatively simple construction, such systems require a lengthened waveguide pass or discharge pass for acquiring a laser beam of large output. Accordingly, in a lengthwise excitation system, the problem of providing the requisite discharge voltage is increased since the interval between electrodes is increased. In the transverse excitation system a problem with respect to efficiency develops because of the difficulty of providing spacial uniformity of discharge between the electrodes.

In view of the foregoing problems, the output from a waveguide type gas laser apparatus utilizing DC excitation is generally on the order of a few watts at the most.

Figure 3:
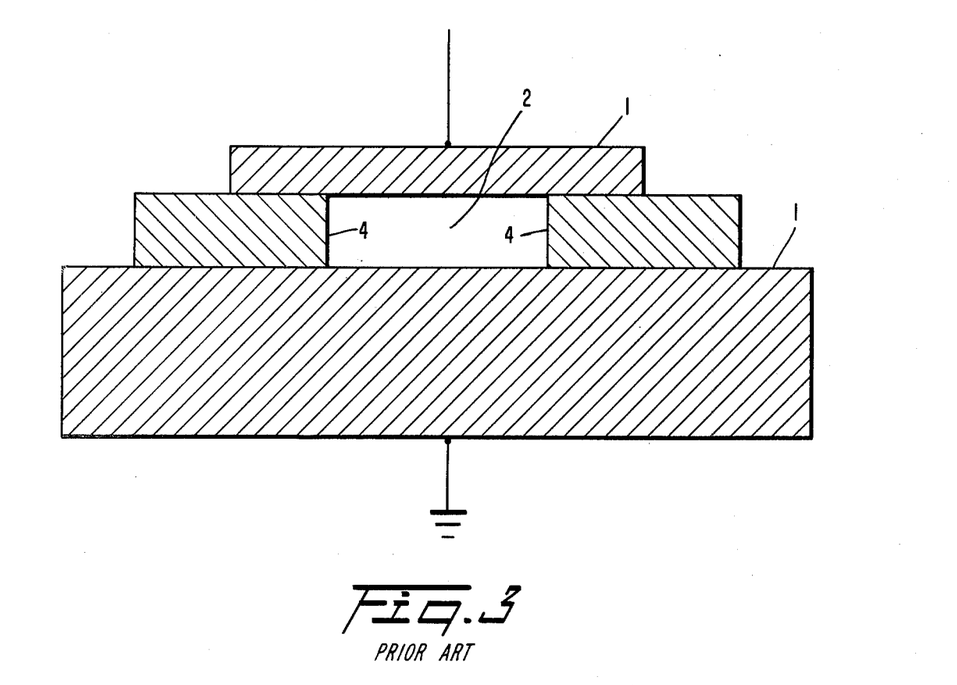
FIG. 3 schematically illustrates a section of a waveguide employed in a radio frequency excitation system.

A high-frequency excitation system is shown in FIG. 3 as comprising a pair of electrodes 1 disposed in parallel to face one another. Electrodes 1 are separated by insulators 4. Electrodes 1 and insulators 4 operate to define a waveguide passageway 2. A high-frequency or radio frequency field may be developed in passageway 2 in the VHF or UHF zone of 30 Mhz to 36 Ghz by application of such radio frequency signals to electrodes 1. A radio frequency excitation system such as that disclosed in FIG. 3 has the following advantages:

1. A greater life expectancy than in a D.C. excitation system due to lack of mirror contamination and gas separation by removing the "cathode fall" phenomena found in DC excitation systems.

2. A reduction in the loss of excitation energy by the removal of "cathode fall."

3. A reduction in the size of the power supply since the excitation voltage can be as low as 100 volts if the electrodes are located in a transverse orientation as shown in FIG. 3.

4. Elimination of the need for a ballast resistor to achieve discharge stabilization due to positive discharge impedance, thereby reducing the size and increasing the efficiency of the apparatus.

5. A greater uniformity of spatial distribution of discharge.

6. A higher output from a smaller and lighterweight apparatus.

However, radio frequency excitation systems are subject to the following disadvantages:

1. The requirement of having a radio frequency excitation source in addition to a DC voltage supply.

2. The requirement of having impedance matching between the waveguide passageway and the radio frequency excitation source.

3. Substantial heat generation in the radio frequency excitation source due to conversion inefficiency from DC to radio frequency signals on the order of about 60%, depending upon the frequency involved.

4. The inability to achieve a broad frequency shift due to the need to maintain matching of radio frequency signal with the waveguide passageway so that a wide range of laser output cannot be achieved even with frequency modulation. Moreover, even if the applied high frequency voltage is allowed to change by amplitude modulation, a large loss would result in the radio frequency supply circuit, thereby causing the generation of substantial amount of heat and making it difficult to produce a small and lightweight apparatus due to the need to provide for substantial heat dissipation.

It is therefor an object of the present invention to provide a waveguide type gas laser excitation apparatus which eliminates the disadvantages of radio frequency excitation apparatus while maintaining the advantages of DC excitation systems.

More specifically, it is an object of the present invention to provide a highly efficient, compact waveguide type gas laser excitation system.

Additional objects and advantages of the invention will be set forth in part in the description which follows, and in part will be obvious from the description, or maybe learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a waveguide type gas laser apparatus is provided which comprises: (a) a gas filled light passageway defined by a pair of electrodes disposed facing one another and a pair of insulators separating the electrodes; and (b) means for exciting the gas by repeatedly applying between the electrodes a voltage having a three logic level pulse form which pulse form has alternate positive, zero, negative, and zero voltage levels. Preferably this means for exciting includes means for generating a pair of rectangular pulses which are out of phase with one another; a first switching element which is connected to a positive voltage source; a second switch element which is connected to a negative voltage source; and means for controlling these first and second switching elements with alternate ones of the rectangular pulses, respectively, to establish the above-mentioned three logic level pulse form. The excitation means also preferably include means for varying the pulse width of the positive and negative voltage levels. The excitation means may further comprise means for varying the repetition period of the three logic level pulse form.

BRIEF DESCRIPTION OF THE DRAWINGS

The accompanying drawings, which are incorporated in and constitute a part of the specification, illustrate a preferred embodiment of the invention and, together with the general description of the invention given above, and the detailed description of a preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

Figure 4:
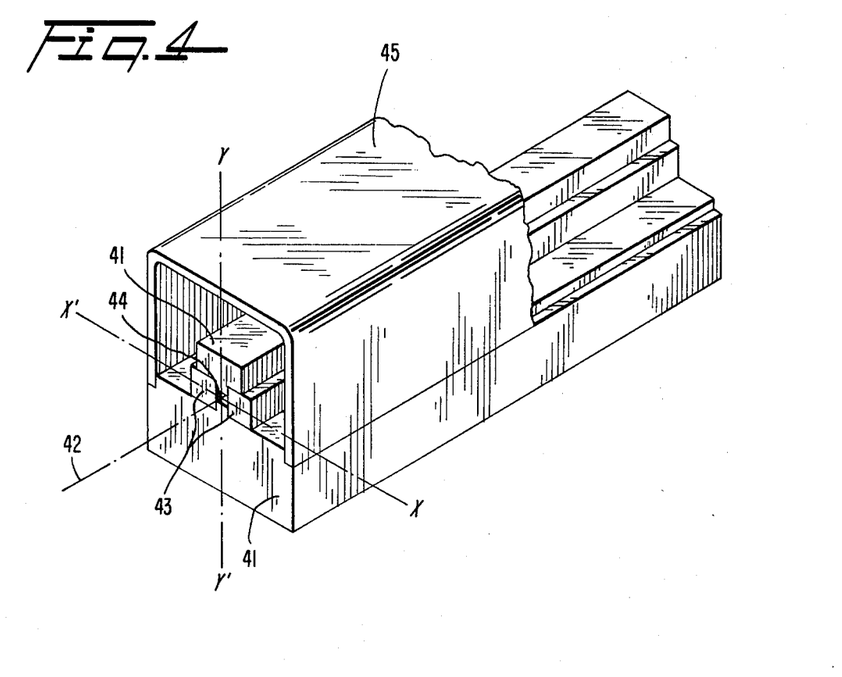
FIG. 4 perspectively illustrates a section of a waveguide used in conjunction with the teachings of the present invention.

Referring to FIG. 4, there are illustrated a pair of electrodes 41, a light axis 42, a pair of insulators 43, a waveguide passageway 44 and an enclosing cover 45. Waveguide passageway 44 is a gas filled light passageway defined by electrodes 41 and by insulators 43. As may be seen from FIG. 4, electrodes 41 extend in a longitudinal direction along light axis 42. Electrodes 41 may consist of metal and, as shown in FIG. 4, are disposed facing one another on opposite sides of light axis 42. Electrodes 41 are separated from one another by insulators 43 which are also disposed apart from one another along light axis 42. Electrodes 41 preferably are fine polished with a roughness or final precision of less than 5 umm on the inner wall surface of waveguide passageway 44, and are manufactured from material having good heat transmission and insulation properties.

Enclosing cover 45 surrounds electrodes 41 and insulators 43. A laser gas fills waveguide passageway 44 and the interior of cover 45. Preferably this gas includes carbon dioxide $CO_2$, nitrogen $N_2$ and helium He, although other laser gases may be utilized.

The construction of waveguide passage 44 illustrated in FIG. 4 is basically similar to the waveguide passageway 2 illustrated in FIG. 3 in connection with a conventional radio frequency excitation system. However, in contradistinction to a conventional radio frequency excitation system, high voltage pulses of three logic values, namely a positive level, a zero level and a negative level, are repeatedly applied to electrodes 41 in order to achieve discharge of the gas within passageway 44. Once excited by such a discharge, the resultant emission light is oscillated within passageway 44 by a pair of resonant mirrors (not shown) disposed one at either end of waveguide passageway 44 to generate a laser light and direct that light along light axis 42.

At the time of discharge, a high temperature heat is generated in waveguide passageway 44 so that the inner surface of waveguide passageway 44 and the gas contained therein is increased in temperature. As the temperature of this gas increases, the gain of the laser decreases. Accordingly, it is necessary to cool electrodes 41 and waveguide passageway 44 of the laser of FIG. 4 in order to prevent this decrease in laser output. Accordingly, electrodes 41 preferably are produced of metallic material having a good heat transmission property. For example, copper, aluminum and the like may be used. In addition, insulators 43 should not only have good optical reflective properties, but should also be produced of material having good heat transmission properties and insulation efficiency. For example, beryllium oxide (BeO), silicon oxide$_n$ (SiO) and aluminum peroxide ($Al_2O_3$), and the like may be utilized. Moreover, it is preferable that heat coupling between electrodes 41 and 43 is as efficient as possible. In this regard, the contact planes of electrodes 42 and insulators 43 are preferably manufactured with sufficient smoothness to make the contact planes of electrodes 41 and insulators 43 fit exactly.

As stated above, high voltage pulses having a three logic level pulse form are applied to electrodes 41. A three logic level pulse form having alternate positive, zero, negative, and zero voltage levels is repeated in extermely short time interval thereby permitting any neutral operation with discharge electrons to be ignored. Namely, as in the case with radio frequency excitation methods, the repetitive application of a three logic level pulse form functions only to control the motion of electrons and positive ions during discharge in the waveguide passageway, but not to apply discharge current. Accordingly, there is no "cathode fall" phenomena.

As a result, there is no spattering, a long life of operation can be expected since gas separation is unlikely, and there is no loss of excitation energy due to cathode fall. Moreover, a low voltage is required to sustain discharge, allowing for low voltage operation. Spatial uniformity of discharge can be obtained since discharge impedence is positive. Even further, a ballast resistor for discharge stabilization is unnecessary once again due to the discharge impedence having a positive property. Accordingly, energy loss due to ballast resistance is non-existent.

Figure 5:
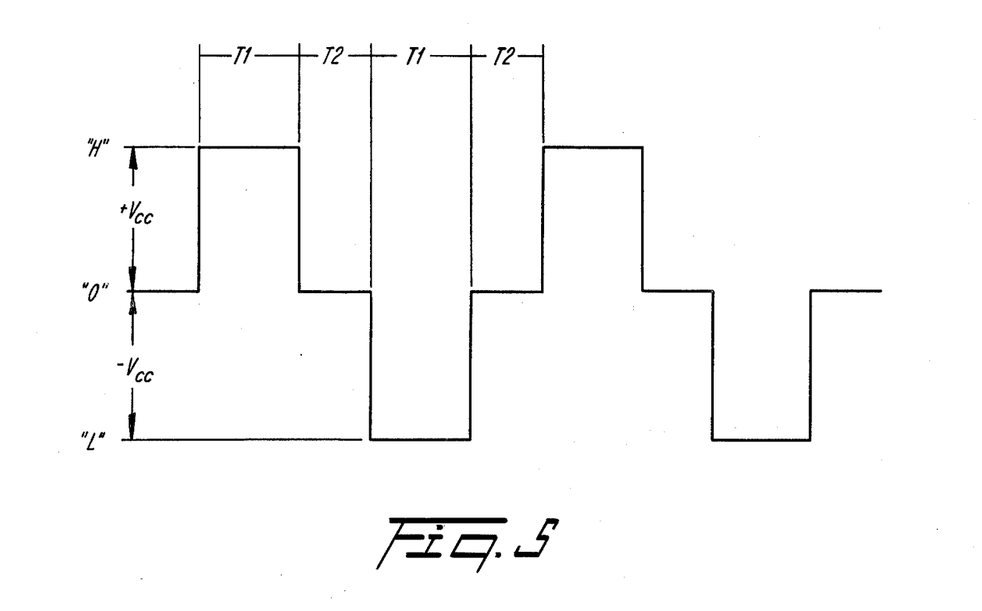
FIG. 5 is a time chart showing a three logic level pulse form to be applied to electrodes of the waveguide in FIG. 4 in accordance with the teachings of the present invention.

A three logic level pulse form of the subject invention is illustrated in FIG. 5. As shown in FIG. 5, the pulse form of the subject invention encompasses in the first term $T_1$ of time period T a+Vcc voltage logic level, during a second term $T_2$ a zero voltage logic level and during a third term $T_1$ a−Vcc voltage logic level. By applying such a pulse wave form between electrodes 41 many beneficial characteristics may be obtained. For example, although an optimum pulse width value alters considerably with gas pressure and the physical distance between electrodes, a voltage value of Vcc as represented by the following formula may be assumed:

$$100v < |\pm Vcc| < 200 v \quad (1)$$

Such a range achieves satisfactory discharge, if the gas pressure is on the order of 100 torr and the electrode interval is on the order of 1 mm.

Although the pulse repetition period T is represented by the following formula:

$$T = 2T_1 + 2T_2 \quad (2),$$

it is preferable that time period T fall within the following limits:

$$30\ ns \leq T \leq 10,000\ ns \quad (3)$$

The lower limit of pulse repetition period is arbitrarily set at 30 ns since the shortest reponse time of any known pulse oscillation element or switching element now available is on the order of several ns. However, that lower limit would ideally be on the order of 10 ns depending upon the characteristics of the waveguide passage, except for the presently existing problem relating to the pulse oscillation or switching element. On the other hand, the upper limit value of the pulse repetition period T has no clearly definitive boundry, but generally is considered to be on the order of 10,000 ns.

Figures 6, 7A:
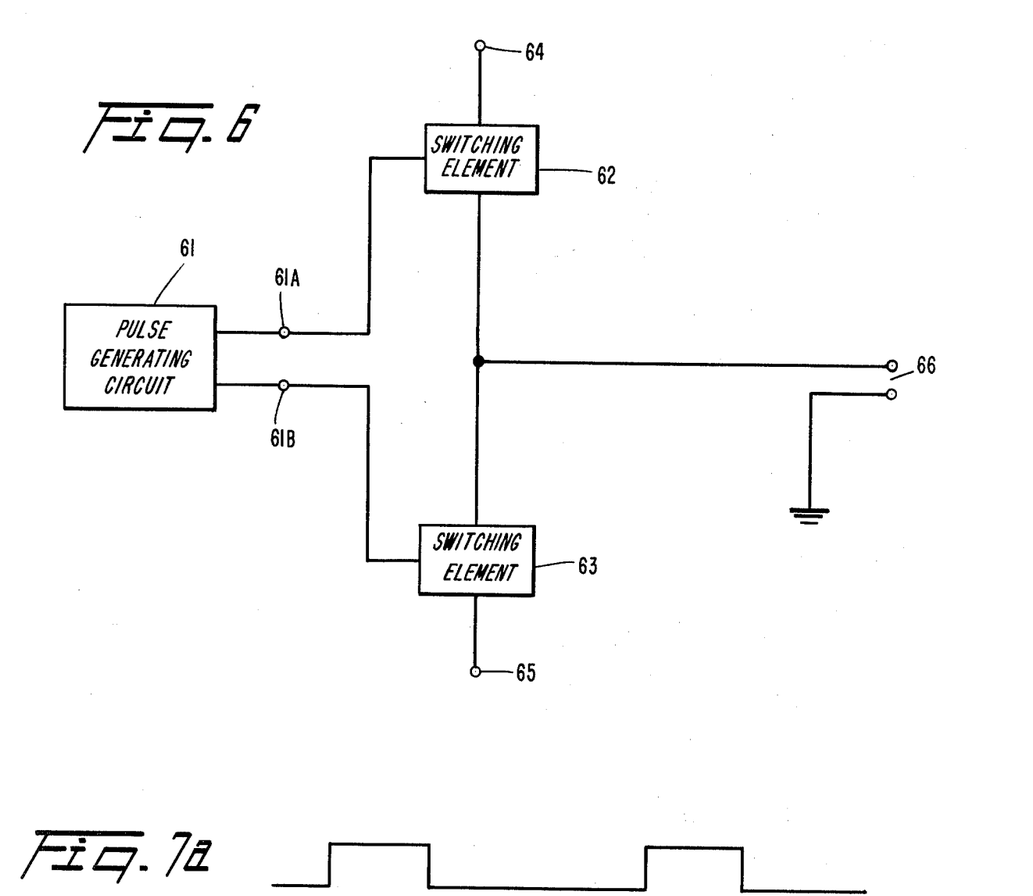
FIG. 6 is a block diagram of a circuit illustrating an excitation source incorporating the teachings of the present invention.

In FIG. 6 there is illustrated a basic block diagram incorporating the teachings of the present invention, namely, incorporating a high repetition pulse transverse discharge excitation (HRP) method according to the subject invention. As illustrated in FIG. 6, a pulse generation circuit 61 has an output terminal 61a issuing switching signals of FIG. 7(a) and an output terminal 61b issuing switching signals of FIG. 7(b). A switching element 62 is coupled to a positive voltage source at terminal 64 and a switching element 63 is coupled to a negative DC voltage source at terminals 65. Switching element 62 is on/off controlled by the FIG. 7(a) switching signals appearing in at output terminal 61a of pulse generating circuit 61; and switching elements 63 is on/off controlled by the switching signals of FIG. 7(b) appearing at output terminal 61b of pulse generation circuit 61. When conductive, switching element 62 provides a positive DC voltage signal, such as +Vcc, to terminal 66, whereas when switching element 63 is conductive there is supplied to terminal 66 a negative DC voltage, such as −Vcc. The resultant signal at terminal 66 is the three logic level pulse form illustrated in FIG. 7(c).

Figure 8:
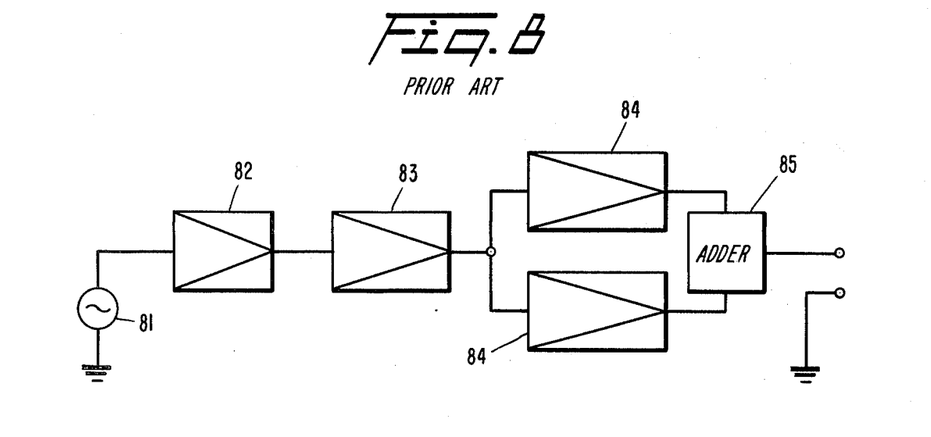
FIG. 8 is a block diagram illustrating a circuit of a 500 W excitation source utilizing conventional radio frequency excitation techniques.

According to the present invention, by applying a three logic level pulse form to the electrodes of a transverse waveguide type gas laser an excitation efficiency as least as great as the efficiency accomplished by a conventional radio frequency excitation system can be achieved, but with a pulse generation source which has simplier circuits and which is more compact, lighter and cheaper than conventional radio frequency excitation sources. In this regard, there is shown in FIG. 8 a basic construction of a typical radio frequency excitation source on the order of 500 watts. High frequency output in the VHF or UHF range is generated from an oscillator 81 and then amplified with a buffer amplifier 82 which in turn is followed with a small power amplifier 83. The output of amplifier 83 is further amplified with a large power amplifier 84. Large power amplifier 84 may, for example, utilize a parallel method of amplification and then compound both amplified outputs to a single output using the operation of adder 85.

In contradistinction, an excitation source according to the present invention of 500 watt output can be constructed of a pulse generator comprising the pulse generator circuit 61 and switching elements 62 and 63 of FIG. 6.

In addition, in the radio frequency excitation method, the efficiency of converting energy from a DC source to a high frequency pulse or radio frequency energy is theoretically on the order of 75% in the case of using class A or AB amplifiers, Although the exact percentage may differ with the specific configuration of the amplifier. However, in fact, only 60% to 70% energy efficiency is achieved when the appended circuits and peripheral circuits are considered. Consequently, 30 to 40% of supplied energy is consumed as heat within a radio frequency excitation source.

If a large radio frequency excitation source is utilized, such a loss would represent a significant portion of energy available and, therefore, could not be ignored. For example, when 500 watts in output is generated, 210 to 230 watts of energy is simultaneously generated in the form of heat loss. Accordingly, there must be substantial heat dissipation countermeasures resulting in the necessity of a large physical apparatus. Also, an energy conversion efficiency having 30 to 40% loss requires that nearly 800 watts of energy be supplied from the DC source to achieve 500 watts of high frequency output.

On the other hand, the excitation source of the subject invention, by utilizing alternate positive and negative sources interspersed with zero voltage levels, allows for D class amplification operation since the active device or active element in such an excitation source is allowed to function in simple on/off operation. D class operation is theoretically 100% efficient, thus the excitation source of the subject invention, where D class operation is utilized in the final stage, clearly minimizes losses and provides an operational configuration which is nearly ideal.

Figure 9A:
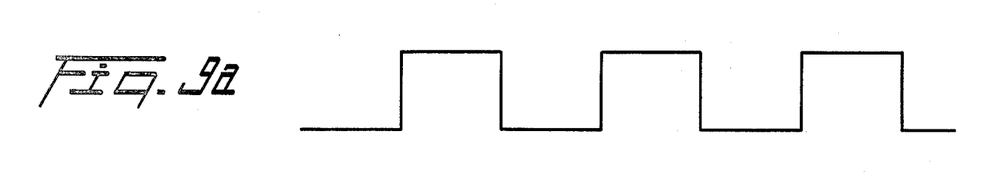
FIG. 9 is a time chart illustrating a two logic level pulse form.
Figure 9B:
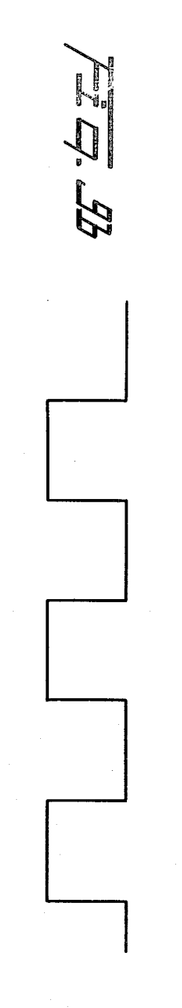
Figure 9C:
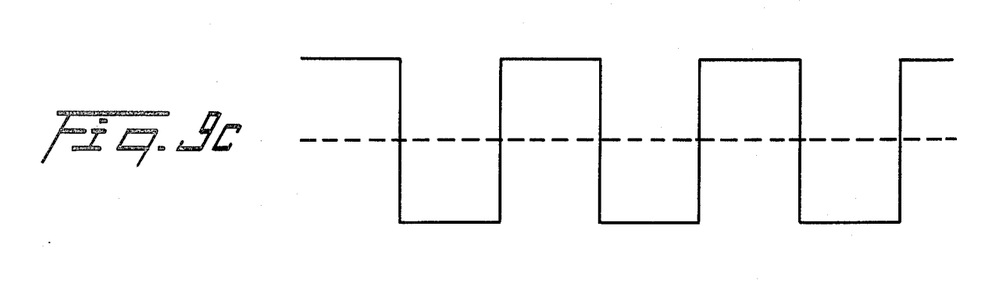

However, in fact, D class operation also experiences some loss due to the shortness of switching periods, which losses are generally referred to as transient losses. Such transient losses appear to result in a operation substantially approximating A class operation during the short transient time from on to off or from off to on. Moreover, since saturation regions exist in the switching element itself, some losses are experienced in the on state, which losses are referred to as saturation losses. However, all these losses collectively add to only a 10% loss of input DC energy. The three logic level pulse form of the subject invention is also more beneficial than a simple two logic level pulse form. In the case of making high speed pulses of two logic values which have a repetition time of more than 10⁷ pulses per second, if switching elements are controlled with switching signals as shown in FIGS. 9(a) and 9(b) using the basic circuit of FIG. 6, rectangular pulses of a two logic level pulse form as shown in FIG. 9(c) are achieved from output terminal 66. However, at the transient state of such pulse making process, namely the time when one switching element turns from on to off and the other from off to on, both switching elements are for a brief moment on so that there a large current flows from the positive source terminal 64 to the negative source terminal 65. As such a time, a loss of 10 to 20% of the input energy results.

In the excitation source of the present invention, utilizing a three logic legel pulse form, the low efficiency property provided by a two logic level rectangular pulse control of the above-mentioned type is eliminated and D class operation is permitted. As the total losses of the invention are only transient losses, saturation losses and energy losses in the peripheral circuits, an efficiency of 90% can be established for the first time.

Control of a laser output may be accomplished by either of the following two methods. The first of these two involves pulse width variation in which the laser output is controlled by allowing the discharge current to change by varying the term $T_1$ while holding the term T (namely $2T_1 + 2T_2$) constant. A second method involves a repetition period variation in which the laser output is controllable by allowing the discharge current to change by varying $T_2$ or $(2T_1 + 2T_2)$ while holding the term $T_1$ constant.

Figure 10:
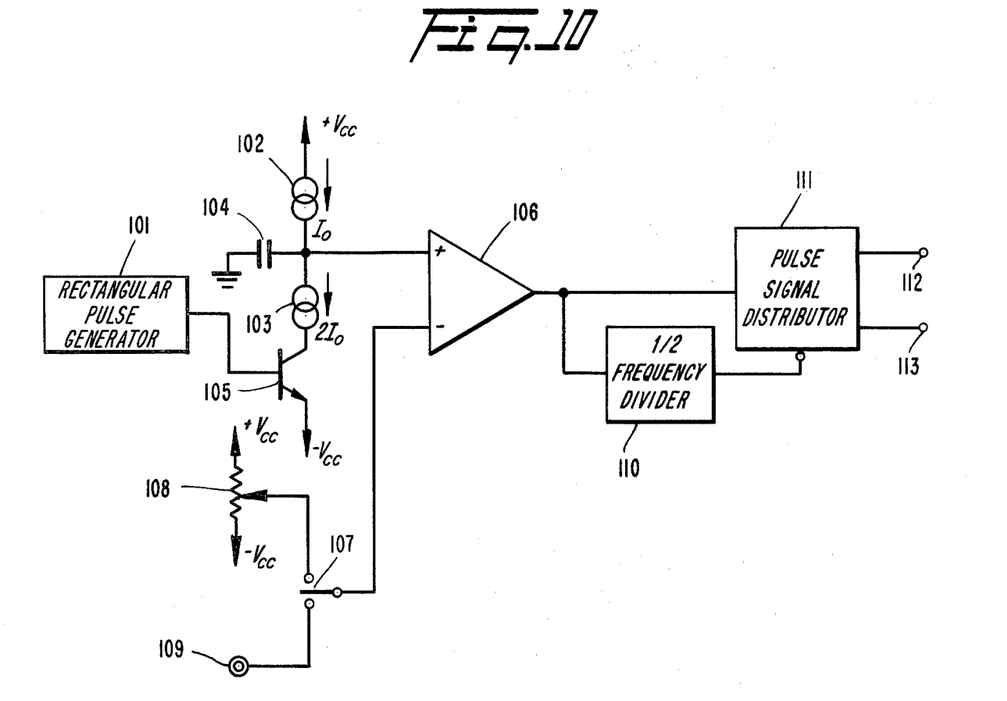
FIG. 10 is a block diagram of a circuit employing a pulse width variable aspect feature of the subject invention.

A circuit for achieving the pulse width variable method of the subject invention is shown in FIG. 10 by way of illustration but not limitation. More specifically, there is illustrated a rectangular pulse generator 101 which generates a series of rectangular pulses having two amplitudes, zero and $-Vcc$, and a time period of $(T_1 + T_2)/2$. A stable current source 102 having a current value $I_O$ and a stable current source 103 having a current value of $2I_O$ are connected in series between a voltage source $+Vcc$ and the collector of transistor 105. The emitter of transistor 105 is coupled to a DC negative voltage source $-Vcc$, whereas the base of transistor 105 is coupled to the output of rectangular pulse generator 101. A condenser 104 is connected between the common junction of stable current sources 102 and 103 and ground.

In operation, transistor 105 is off when the output of rectangular pulse generator 101 becomes $-Vcc$ and a stable current $I_O$ flows into condenser 104 from the stable current source 102. The discharge voltage on condensor 104 rises up linerally in accordance with $$1/C \int_o^t I_o dt.$$

When transistor 105 turns on, the discharge voltage across condenser 104 goes down linerally in accordance with $$1/C \int_o^t (I_o - 2I_o)dt = -1/C \int_o^t I_o dt,$$

where C is the capacitance of condenser 104. Consequently, a triangular wave voltage changing alternately in both positive and negative directions develops between the terminals of condenser 104.

A comparator 106 is connected at its positive input terminal to the output of condenser 104 to receive the above-mentioned triangular wave form. A negative input of comparator 106 is connected to a selectable switch 107, one terminal of which is coupled to a variable pick off point of resistor 108. Resistor 108 has one end coupled to a positive voltage supply $+Vcc$ and another end connected to a negative voltage supply $-Vcc$. The second terminal of switch 107 is coupled to input terminal 109 which will be discussed in more detail below.

When switch 107 couples the negative input of comparator 106 to the sweep arm of variable resistor 108, a constant DC voltage is applied to the negative input of comparator 106 depending upon the position of the sweep arm of resistor 108. When the triangular wave voltage applied to the positive input of comparator 106 is larger than the constant DC voltage applied to the negative terminal of comparator 106, the output of comparator 106 is converted from negative to positive. When the triangular waveform is smaller than the voltage appearing at the negative terminal of comparator 106, the output of comparator 106 switches from positive back to negative. Accordingly, the time period during which the output of converter 106 is positive is a function of the position of the sweep arm on resistor 108. The more positive the voltage provided by resistor 108, the smaller the positive rectangular pulse width of comparator 106, while the more negative the voltage applied by resistor 108, the larger the positive pulse width of comparator 106. Accordingly, the output pulse width of comparator 106 can be changed by variable resistor 108.

A one-half frequency divider 110 divides the output frequency of comparator 106 in half. The output of comparator 106 is also coupled to pulse signal distributor 111 which in turn is controlled by one half-frequency divider 110, causing pulse signal distributor 111 to operate to deliver the pulse output of comparator 106 alternately to one of its terminals 112 and 113 in accordance with the operation of one half-frequency divider 110. The output of terminals 112 and 113, accordingly, correspond to the signals appearing at termina 61a and 61b of FIG. 6.

Figure 11:
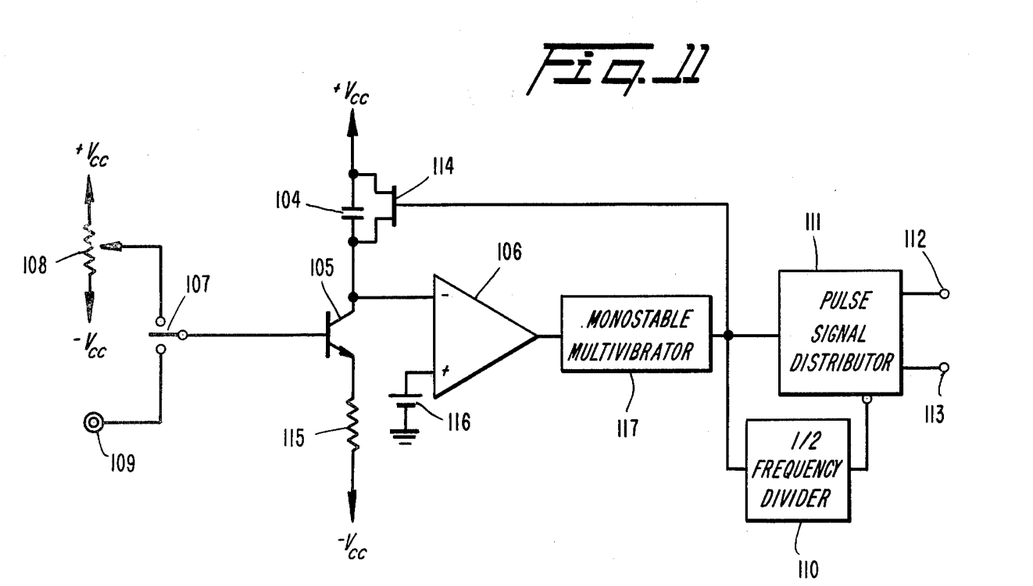
FIG. 11 is a schematic diagram of another embodiment of the subject invention employing a variable repetitive period feature of the present invention.

A repetition period variable method control system is illustrated in FIG. 11 by way of example and not limitation. As shown, stable current sources 102 and 103 as well as condenser 104 of FIG. 10 are replaced in FIG. 11 with a triangular wave generator wherein condenser 104 is connected between the collector of transistor 105 and a positive source of DC potential +Vcc. Moreover, the source-drain path of FET 114 is connected in parallel with condenser 104, thereby providing charge and discharge control over condenser 104. In the rectangular wave generator of FIG. 11, variable resistor 108 produces a constant DC voltage and modulation signals or negative feedback signals may be applied to terminal 109. Switch 107, as in FIG. 10, operates to select either a constant DC voltage value as determined by resistor 108 or the signal appearing at terminal 109.

Transistor 105 operates as a voltage-current converter with its base connected to switch 107 and its emitter connected to a negative DC voltage supply −Vcc through resistor 115. Condenser 104 is charged substantially linearly from the positive DC source +Vcc to the negative DC source −Vcc as a function of the collector current of transistor 105. Since the negative input terminal of comparator 106 is connected to the collector of transistor 105 and a reference voltage 116 of $V_Z$ level is applied to the positive input terminal of comparator 106, the output of comparator 106 is converted from a low level to a high level if the collector voltage of transistor 105 is less than $V_Z$.

The comparator output is applied to a monostable multivibrator 117 so that the output of multivibrator 117 rises to a high level for a fixed time. The output of multivibrator 117 is simultaneously provided to the control electrode of FET 114 to the input of pulse signal distributor 111, and to the input of one half frequency divider 110. Accordingly, the output of monostable multivibrator 117 operates to reset FET 114, permitting condenser 104 to recover to an initial state.

As in FIG. 10, the output of one-half frequency divider 110 is applied as a control signal to pulse signal distributor 111, causing distributor 111 to issue signals from multivibrator 117 alternately from two output terminals 112 and 113. Meanwhile, since the output of monostable multivibrator 117 is applied to pulse signal distributor 111 as an input, the output of multivibrator 117 is delivered alternative to the output terminals 112 and 113 of pulse signal distributor 111. Accordingly, the output terminals 112 and 113 correspond to terminals 61a and 61b of FIG. 6.

Figure 7B:
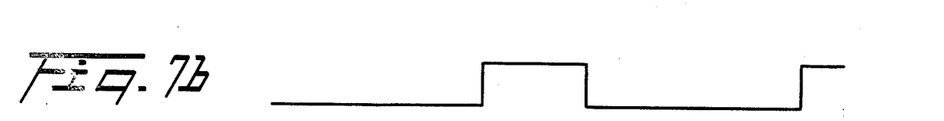
FIG. 7 is a time chart showing voltage waveforms at identified parts of the circuit illustrated in FIG. 6.
Figure 7C:
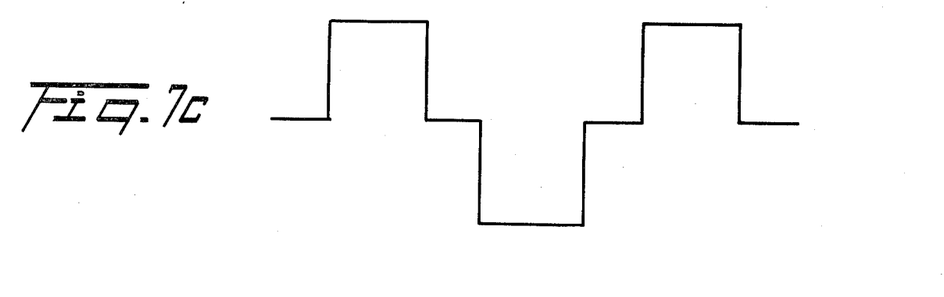

The output of comparator 106 is not only applied to mono-stable multivibrator 117, but also is delivered to FET 114. Accordingly, FET 114 turns on, causing condenser 104 to be discharged as a function of the output of multivibrator 117. FET 114 then turns off after termination of the pulse generated by multivibrator 117 and condenser 104 is charged once again. Since the terminal voltage of condenser 104 is small when charging begins, the output of comparator 106 is sustained in a negative state until the terminal voltage of condenser 104 exceeds the reference potential $V_Z$ at which time the condenser discharge begins. Since the output of multivibrator 117 again becomes positive when the terminal voltage of condenser 104 exceeds $V_Z$ at this time multivibrator 117 issues the desired time width pulse, and the above mentioned operation is repeated. When receiving the output pulses of multivibrator 117, the one-half frequency divider 110 divides the pulse frequency in half and delivers that reduced frequency signal as a control signal to pulse distributor 111. Distributor 111 is thereby caused to distribute alternate signals from multivibrator 117 to terminals 112 and 113 respectively, under control of frequency divider 110. As a consequence, the outputs as shown in FIG. 7(a) appear at terminal 112 and the outputs as shown in FIG. 7(b) appear from output terminal 113.

In the circuit of FIG. 11 since the discharge speed of condenser 104 is determined by both the base voltage of transistor 105 and resistor 115, with the adjustment of one or both the discharge speed of condenser 104 changes and the pulse repetition period can be changed, within the scope determined by the working region of mono-stable multivibrator 117. In the two control systems shown in FIGS. 10 and 11 a large controllable range of operation is achieved. Using such circuits, a part of the laser output may be light-to-electric converted to achieve a representative signal indicative of the difference between the actual laser output and a reference value, and this difference signal may be applied to terminal 109 after amplification to provide a negative feedback. Namely, when the laser output is less than the set reference value, the voltage applied to terminal 109 may be made smaller and the laser output thereby controlled to increase in value as a result of pulse width enlarging. To the contrary, when the laser output is greater than the preset value, the laser output may be decreased as a result of a decreasing pulse width under the control of the signal applied at terminal 109. With such an arrangement, it is possible to achieve stabilization of the laser output easily and readily. It is also possible to perform a pulse width modulation by applying a very small AC signal to terminal 109. Furthermore, although the controls of FIGS. 10 and 11 provide a laser output adjustment range from nearly zero to 100%, they do so in a highly efficient manner without the appearance of special losses, thereby permitting the control apparatus to be put into a compact and lightweight unit.

As should be apparent to those skilled in the art, modifications and variations can be made in the above disclosed embodiments without departing from the scope or spirit of the invention. For example, the cross-sectional configuration of the waveguide used in conjunction with the subject invention need not only be rectangular as shown in FIG. 4 but also may be square, regular hexigon, regular octagon or the like. Moreover, the waveguide configuration need not necessarily be symmetrical, since a mere multi-angle configuration may be used. Furthermore, the alternate pulse configuration of the three logic level pulse form of the subject invention may be defined not only by $+V_{cc}$, zero and $-V_{cc}$, but also by $+V_1$, zero, and $-V_2$, although $V_1=V_2$ is desirable to increase efficiency operation of the laser. Nevertheless in practice, the values of $V_1$ and $V_2$ cannot be clearly determined. Furthermore, although the circuit for both a pulse width variable method and repetition variable method were shown in FIGS. 10 and 11, it is possible to perform similar operations using different circuits. This is especially true since in recent years a number of voltage-to-frequency conversion methods have been developed as well as voltage-to-pulse width conversion methods using integrated circuit techniques, to achieve functions equivalent to the functions achieved by the circuits of FIGS. 10 and 11. Also, the apparatus according to the present invention may be used not only as an oscillator, but also as an amplifier.

Additional advantages and modifications will readily occur to those skilled in the art. The invention in its broader aspect is, therefore, not limited to the specific details, representative apparatus and illustrative examples shown and described. Accordingly, departures may be made from such details without departing from the spirit or scope of applicant's general inventive concept.

I claim:

1. In a waveguide type gas laser apparatus including
   a gas filled light passageway defined by a pair of electrodes disposed facing one another and a pair of insulators separating said electrodes; the improvement comprising
   means for exciting said gas by repeatedly applying between said electrodes a voltage having a three logic level pulse form which pulse form has alternate positive, zero, negative and zero voltage levels whereby the motion of electrons and positive ions during discharge in said passageway is controlled.

2. The waveguide type gas laser apparatus of claim 1 wherein said means for exciting includes:
   a. means for generating a pair of rectangular pulses which are out of phase with respect to one another;
   b. a first switching means coupled to a positive power supply;
   c. a second switching means coupled to a negative voltage supply,
   d. means for controlling said switching means with alternate ones of said rectangular pulses, respectively, to establish said three logic level pulse form.

3. A waveguide type gas laser apparatus of claim 1 or claim 2 wherein said means for exciting includes means for varying the pulse width of said positive and negative voltage levels of said three logic level pulse form.

4. A waveguide type gas laser apparatus of claim 1 or claim 2 wherein said means for exciting includes means for varying the repetition period of said three logic level pulse form.

* * * * *